United States Patent [19]
Underhill

[11] Patent Number: 5,816,336
[45] Date of Patent: Oct. 6, 1998

[54] APPARATUS AND METHOD FOR DESTROYING WET/DRY AERATION CORES

[76] Inventor: Kenneth R. Underhill, 219 Miller St., Strasburg, Pa. 17579

[21] Appl. No.: 791,363

[22] Filed: Jan. 30, 1997

[51] Int. Cl.⁶ .......................... B65G 67/02; A01B 45/02
[52] U.S. Cl. ........................ 172/22; 172/32; 172/33; 198/311; 198/317; 198/510.1; 198/520; 414/501
[58] Field of Search ...................... 172/22, 21, 33, 172/32; 56/16.4 R, 16.5, 16.6, 228; 198/312, 311, 317, 520, 510.1; 414/501, 486, 487

[56] References Cited

U.S. PATENT DOCUMENTS

| | | | |
|---|---|---|---|
| 620,198 | 2/1899 | Todd | 171/24 |
| 1,018,513 | 2/1912 | Meyer | 171/24 |
| 1,368,113 | 2/1921 | Carlson | 171/24 |
| 2,243,650 | 5/1941 | Poll | 172/33 X |
| 2,624,415 | 1/1953 | Moore | 172/33 X |
| 3,410,350 | 11/1968 | Ware | 172/32 |
| 3,739,857 | 6/1973 | Little | 172/22 |
| 3,797,578 | 3/1974 | Velasquez | 172/22 |
| 3,983,942 | 10/1976 | Vega | 172/32 |
| 4,148,362 | 4/1979 | Orth | 172/22 |
| 5,002,453 | 3/1991 | Shigehisa | 414/502 |
| 5,069,293 | 12/1991 | St. Romain | 172/22 |
| 5,178,221 | 1/1993 | Hamawaki et al. | 172/33 X |
| 5,423,386 | 6/1995 | Lapearous | 172/22 |
| 5,469,922 | 11/1995 | Bjorge | 172/22 |
| 5,628,170 | 5/1997 | Vargas | 56/16.4 R |

*Primary Examiner*—Michael J. Carone
*Assistant Examiner*—Christopher J. Novosad

[57] ABSTRACT

An aeration machine is provided with a split tine assembly having a movable spoon portion that disengages from the tine to discharge a wet core therefrom. The movement of the spoon portion is controlled by a cam mechanism that controls the point of discharge of the core from the tine. A core destroying machine is connectable to the aeration machine to receive wet cores directly therefrom or is operable independently of the aeration machine. The core destroying machine is provided with a stepped screen member that is cooperable with a linearly reciprocating scrubbing mechanism to scrub the aeration cores against the stepped screen in a manner to remove the earthen portion thereof and convey the organic thatch thereof to the discharge end of the screen member for reception in a collection vessel for subsequent remote disposal. A sweep mechanism can be provided to gather aeration cores lying on the ground and convey the aeration cores into the scrubbing mechanism. The method of operating the aeration machine and the core destroying machine provides a method of aerating turf that can be accomplished conveniently and with minimal disruption to the use of the ground.

15 Claims, 9 Drawing Sheets

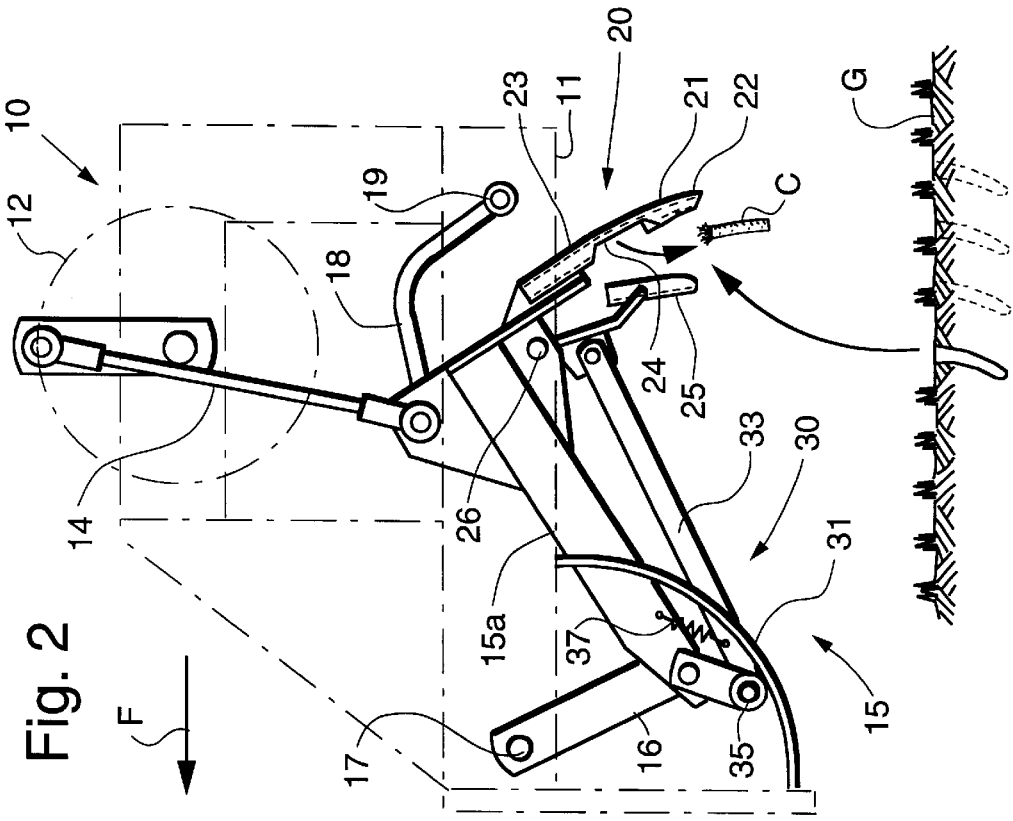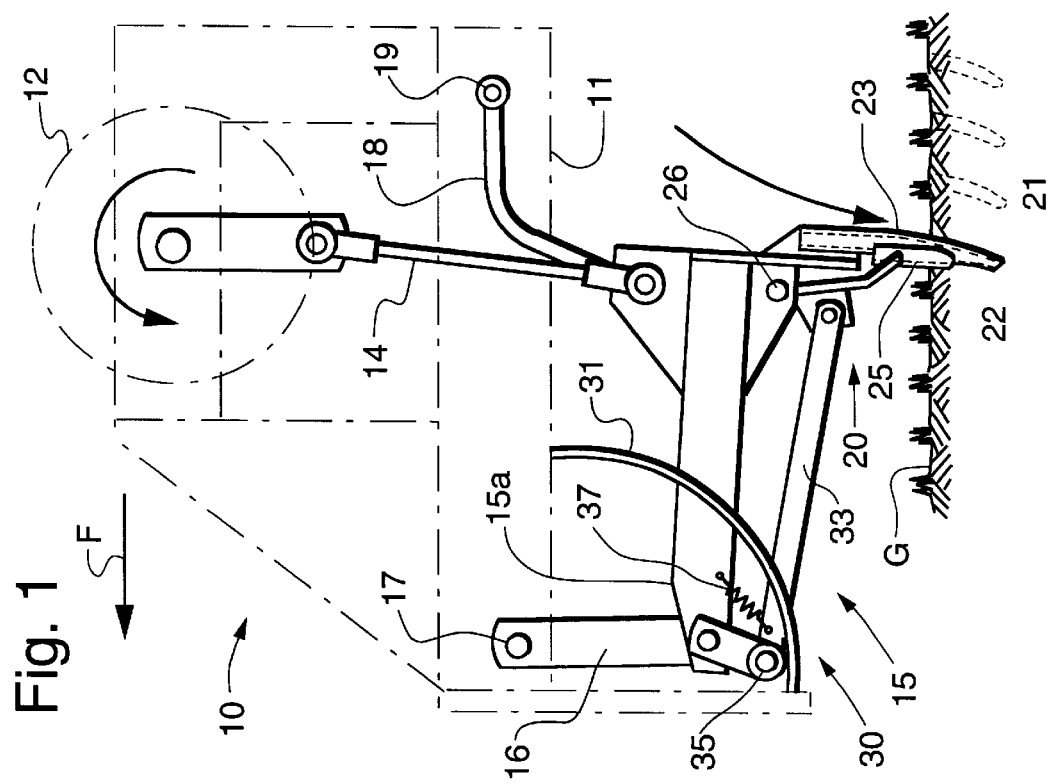

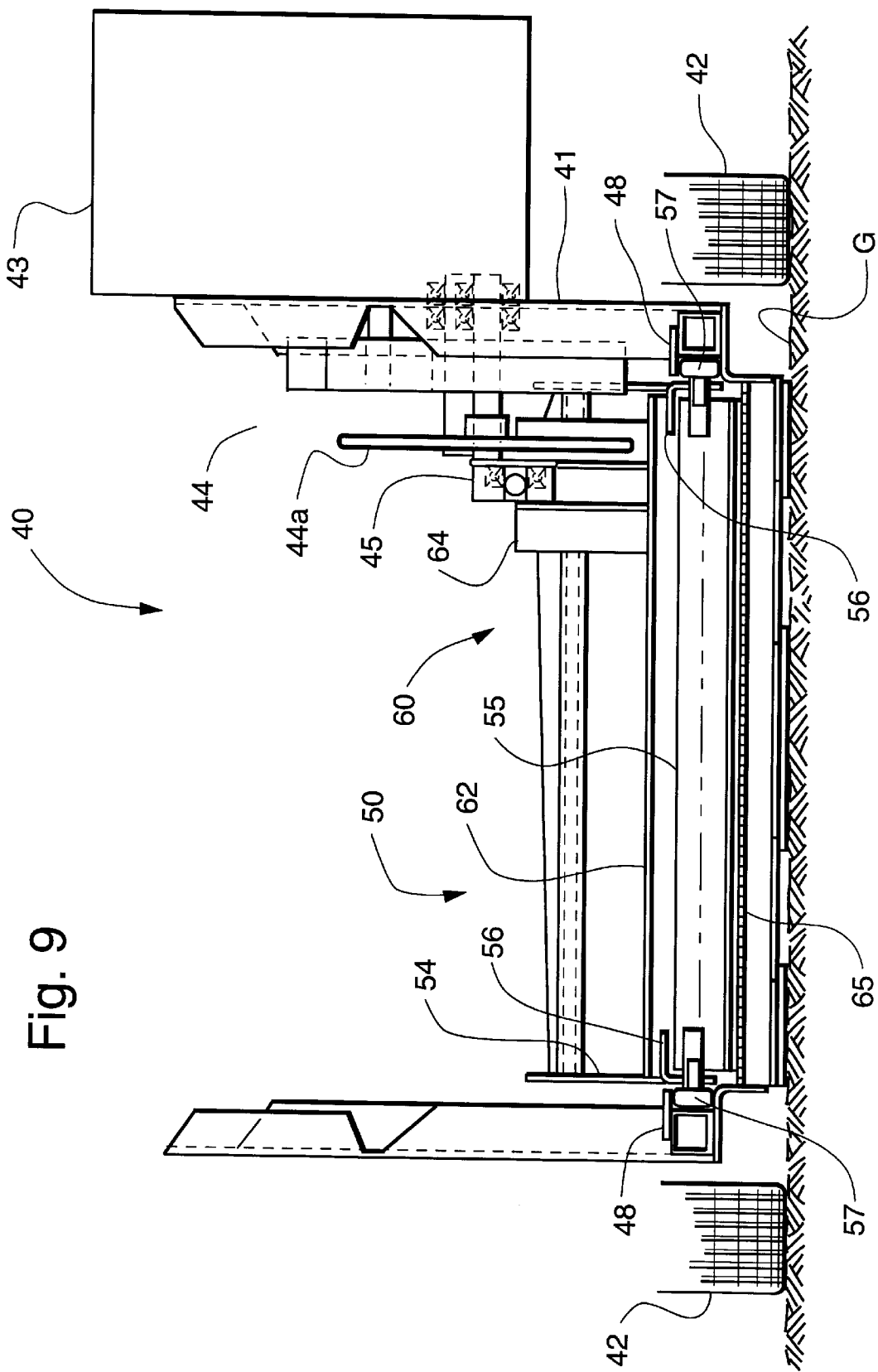

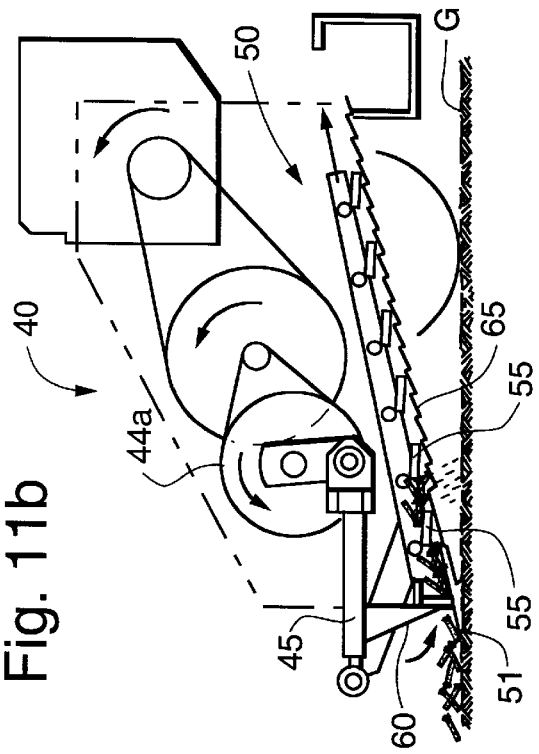
Fig. 11a
Fig. 11b
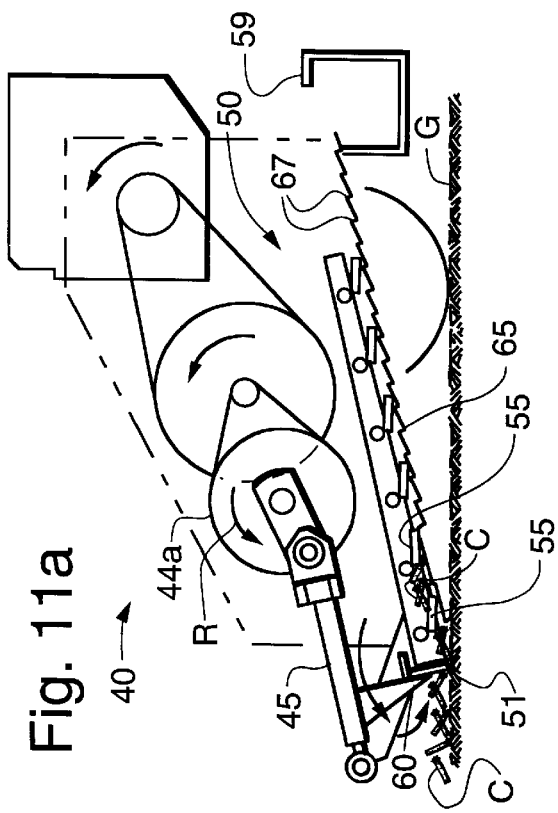
Fig. 11c
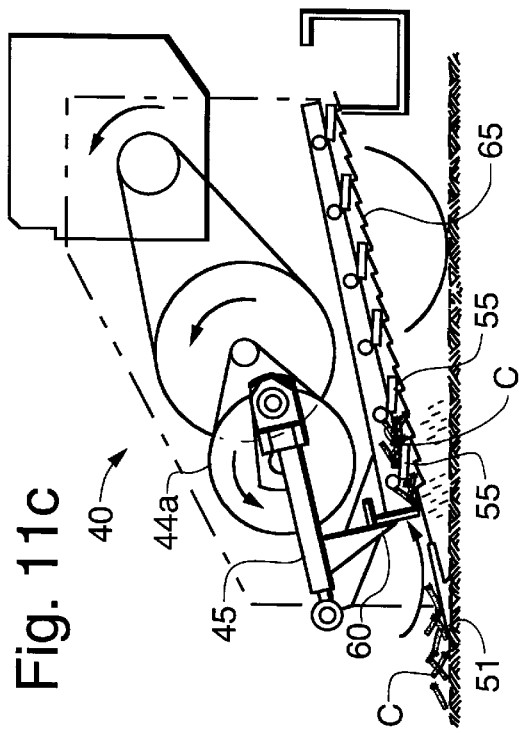
Fig. 11d

APPARATUS AND METHOD FOR DESTROYING WET/DRY AERATION CORES

This application claims the benefit under U.S.C. of provisional Appl. No. 60/010,951 filed on Feb. 1, 1996.

BACKGROUND OF THE INVENTION

This invention relates generally to a machine for receiving green or dry cores from a turf aeration machine that removes plugs or cores of earth from the ground, such as is done on golf courses to enhance the growth of the grasses, and removing the earth from the vegetation thatch. This invention relates more specifically to an apparatus that utilizes a reciprocating, scrubbing action to reduce the cores to the vegetation thatch and return the earth to the ground, while collecting the remaining vegetation thatch.

Aeration machines are well known in the art. These machine drive a hollow tine into the ground to create a plug of earth that is lifted above the surface of the ground and deposited on the surface. Generally, green cores, i.e. cores of earth freshly elevated from the moist ground, also referred to as wet cores, have to be dried for 2 to 4 hours, depending on the weather conditions, before the earthen portion can be removed from the vegetation thatch on top of the plug and the associated root system. It is preferable to return the earthen portion of the cores to the ground; however, the organic matter needs to be removed from the aerated site. Alternatively, the cores can be removed from the aerated site and taken to a remote location for subsequent handling.

While the task of aerating is a highly labor intensive job, the cost of clean-up after aeration is as great as aeration itself. Known core harvesting machines, such as found in U.S. Pat. No. 1,368,113 and in U.S. Pat. No. 3,410,350, suffer from a substantial problem of plugging, particularly if the cores are not adequately dried before collecting and harvesting. If the cores are not dried adequately, the moist earthen portion from the cores plug the core harvesting machines. Under some conditions, the cores can be dried too much and the earth cannot be broken-up properly for satisfactory disposal thereof.

Using golf courses as an exemplary environment typically utilizing aeration to improve the quality of the turf on which the players play, it is undesirable to hinder play for the aeration process. Golf courses and their members do not want their pastime interrupted by maintenance crews and, as a result, the aeration is intentionally done in as short a time as possible. The cores can be picked-up and removed from the ground and taken to a remote location, but this process is very labor intensive and requires the transportation of the green cores from the course. Even cores temporarily left on the ground immediately following the aeration process can be run over by the aeration machine on its next pass, creating problems with a clean pick-up of the cores. Preferably, the cores are not left on the ground for an indeterminate period, even in areas not highly frequented, as mowing becomes complicated due to the cores plugging the mowers and prematurely dulling mower blades.

Current core destroying technology involves the utilization of a machine commonly referred to as a "verti-cutter". This machine is provided with a series of vertically oriented blades that are passed over the surface of the ground to slice cores into finer particles. If the cores are still wet, the verti-cutter can become plugged or wrapped with the vegetation thatch, associated root system and moist earth that is separated from the rest of the core and carried around the vertical blades.

Other known core destroying machines use a cylindrical rotating screen to separate the earth from the organic matter. Such machines require extensive screening area and become quite cumbersome in both handling and operation. Furthermore, the longitudinally extending rotary screen requires a consolidation of the swath of cores into a transversely smaller area, resulting in a dense collection of cores to be destroyed and a concentrated distribution of earth discharged back to the ground. Also, machines using a rotary screen are difficult to couple to an aeration machine so as to receive green cores directly therefrom.

Accordingly, it would be desirable to provide a wet/dry core destroying machine that can be operated immediately following an aerator, or even receiving the green cores directly from the aerator, to reduce the wet cores and return the moist earth directly to the ground, while collecting the remaining vegetation thatch. It would be further desirable if such a wet core destroying machine could be operated at night when golf courses are not being utilized to completely eliminate the interruption of play on golf courses due to the aeration process. It would also be desirable that the core destroying machine be equally operable on wet or dry cores.

Looking at the aerator itself, known machines are operated to drive hollow tines into the ground to create the plug. Typically, each plug is ejected from the hollow tine by the subsequent plug entering the hollow tine the next time the tine is driven into the ground. In moist conditions, aeration tines get plugged and, when subsequently driven into the ground, cause a compaction of the earth, rather than a clean removal of a fresh aeration plug from a subsequent plug taken from the ground. Soil compaction from heavy machines is also a significant problem, particularly in the Fall when root systems are shallow and sensitive to machine weight and tine operation. Controlled ejection of the plugs is generally not found in aerators as there is not a significant concern as to where the plugs are ejected onto the ground surface, except on golf course greens.

Aeration tines are subject to substantial wear from the continual pounding into the ground; hence, durability is a problem. Aeration tines on machines used on golf courses generally last only 3 to 8 greens and require approximately ten to twenty minutes to replace. Accordingly, it would be desirable to improve known aerator machines to control the depth penetration of the tine, improve the operative life of the tines, control the ejection of the cores from the tines so as to be able to deposit the cores into a desired location.

It would be particularly desirable to provide a combination aerator/core destroyer machine that could in one pass across the ground aerate the ground, eject the cores into a core destroying component, destroy the green cores to return the earth to the ground in the form of a top dressing, and collect the organic matter. Since the green cores never need to be deposited on the ground and dried for any predetermined period of time, such an operation would not be sensitive to the time of day during which the aeration is being accomplished. As a result, aeration could be accomplished by such a machine at night without interruption of operation of a golf course or other appropriate facility.

SUMMARY OF THE INVENTION

It is an object of this invention to overcome the disadvantages of the prior art aeration machines by providing an aeration machine operable to extract aeration cores from the ground and discharge the cores in a controlled manner.

It is another object of this invention to provide an aeration machine having a split tine design to control the location of the discharge of the green core therefrom.

It is a feature of this invention that the split tine design includes a spoon portion that is disengageable from the tine to allow the discharge of the tine therefrom.

It is another feature of this invention that the movement of the spoon is controlled by a cam mechanism that opens the tine at the desired location to control the discharge of the wet aeration core therefrom.

It is an advantage of this invention that the discharge of the wet core from the tine can be controlled by timing the movement of the spoon from the fixed portion of the tine member.

It is another advantage of this invention that the control of the discharge of the wet core from the aeration machine permits the wet core to be deposited into a collection device so that the wet core never gets deposited on the ground.

It is still another object of this invention to provide a core destroying machine operable to disintegrate wet or dry aeration cores and allow the earthen portion to be returned to the ground as a top dressing, while collecting the organic thatch portion thereof.

It is still another feature of this invention that the core destroying machine includes reciprocating vanes that scrub across a corrugated screen to disintegrate cores.

It is yet another feature of this invention that the screen member is provided with stepped edges against which the scrubbing mechanism pushes the aeration cores for disintegration thereof.

It is still another advantage of this invention that the organic thatch material of the aeration cores is swept rearwardly by the scrubbing mechanism until discharged into a collection vessel.

It is a further feature of this invention that the machine can be provided with a sweep mechanism to collect aeration cores from the surface of the ground into the scrubbing mechanism.

It is yet another advantage of this invention that the screening material may be formed with hexagonal holes to provide a greater number of shearing surfaces engageable with the aeration cores as the scrubbing mechanism scrubs the cores against the screening material.

It is yet another object of this invention to provide a core destroying machine that is operable in conjunction with an aeration machine to receive green cores directly therefrom to disintegrate the green cores without the cores contacting the ground.

It is still a further feature of this invention that the core destroying mechanism can be adapted directly to a aeration machine to receive the moist aeration cores directly therefrom.

It is a further advantage of this invention that the green cores discharged from the aeration machine never contact the surface of the ground.

It is still a further advantage of this invention that the core destroying mechanism can have a width as great as the operating width of the aeration mechanism so that the earthen portion of the aeration cores can be uniformly discharged from the core destroying mechanism across the entire width of the aerated path.

It is a further object of this invention to provide a core destroying machine that can be utilized in a variety of configurations.

It is still a further object of this invention to provide a method of operation of an aeration machine that controls the discharge of the wet cores.

It is yet a further object of this invention to provide a method of destroying aeration cores that is operable with either wet or dry cores.

It is still a further object of this invention to provide an aeration machine that has a controlled discharge of green cores therefrom and which is durable in construction, inexpensive of manufacture, carefree of maintenance, facile in assemblage, and simple and effective in use.

It is yet another object of this invention to provide an apparatus and method for destroying aeration cores that will reduce labor costs and improve flexibility in utilization.

It is yet a further advantage of this invention that the core destroyer can be utilized at night when ground utilization is minimal.

It is still a further advantage of this invention that labor costs are reduced because of the reduced need for handling the wet aeration cores discharged from the aerator and because the aeration cores are handled faster.

It is still another advantage of this invention that the combined operation of an aerator and an attached core destroyer results in less traffic over the ground and, therefore, less compaction of the aerated ground surface.

It is yet another object of this invention to provide a core destroying machine that is operable to disintegrate wet or dry aeration cores and which is durable in construction, inexpensive of manufacture, carefree of maintenance, facile in assemblage, and simple and effective in use.

These and other objects, features and advantages are accomplished according to the instant invention by providing an aeration machine that has a split tine assembly having a movable spoon portion that disengages from the tine to discharge a wet core therefrom. The movement of the spoon portion is controlled by a cam mechanism that controls the point of discharge of the core from the tine. A core destroying machine is connectable to the aeration machine to receive wet cores directly therefrom or is operable independently of the aeration machine. The core destroying machine is provided with a stepped screen member that is cooperable with a linearly reciprocating scrubbing mechanism to scrub the aeration cores against the stepped screen in a manner to remove the earthen portion thereof and convey the organic thatch thereof to the discharge end of the screen member for reception in a collection vessel for subsequent remote disposal. A sweep mechanism can be provided to gather aeration cores lying on the ground and convey the aeration cores into the scrubbing mechanism. The method of operating the aeration machine and the core destroying machine provides a method of aerating turf that can be accomplished conveniently and with minimal disruption to the use of the ground.

BRIEF DESCRIPTION OF THE DRAWINGS

The inventions disclosed herein will be best understood with reference to the attached drawings, including:

FIG. 1 is a schematic, side elevational view of a part of an aerator machine incorporating a split tine, the tine being driven into the ground to remove a green core therefrom;

FIG. 2 is a schematic, side elevational view of the portion of the aerator machine shown in FIG. 1 with the cam-operated split tine ejecting the green core in a controlled manner;

FIG. 9 is a schematic, partial rear elevational view of the wet/dry core destroying machine shown in FIG. 6;

FIGS. 11a through 11d are diagrammatic sequential representations of the operation of the wet/dry core destroying machine depicted in FIGS. 6–9 showing the second revolution following the sequence shown in FIGS. 10a through 10d, each succeeding Fig. depicting the operation of the machine upon approximately a ninety degree rotation of the drive wheel.

DETAILED DESCRIPTION OF THE PREFERRED EMBODIMENT

Figure 3:
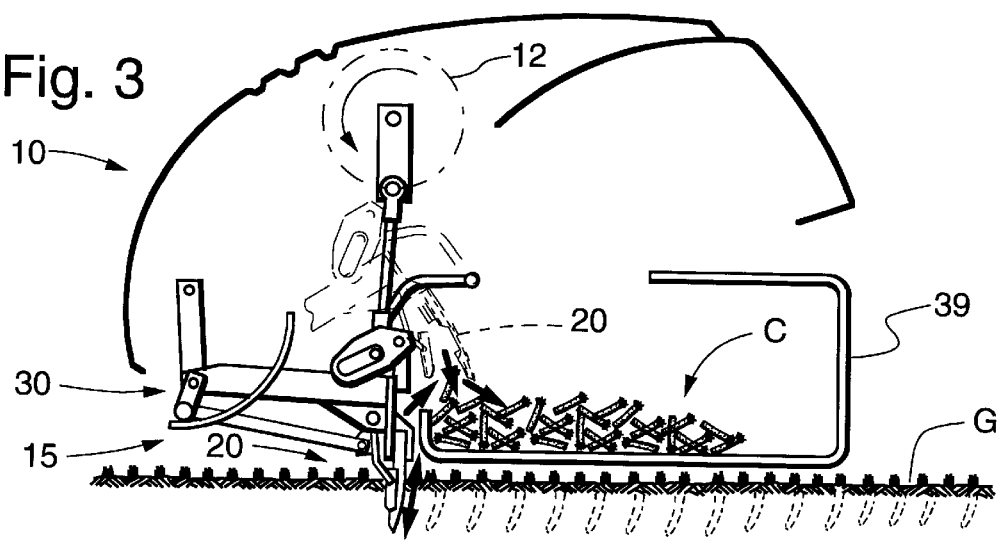
FIG. 3 is a schematic representation of a combination aerator machine as depicted in FIGS. 1 and 2 with a device for collecting the green cores before being deposited on the ground from the split tine.

Referring first to FIGS. 1 and 2, an aeration machine 10 for removing plugs or cores of earth C from the ground can best be seen. A drive mechanism (not shown) drives the rotation of a drive wheel 12 in a conventional manner. The drive wheel 12 has eccentrically mounted thereto a connecting rod 14 that pivotally moves the aeration mechanism 15 generally vertically into and out of engagement with the ground G.

The aeration mechanism 15 is pivotally supported from the frame 11 of the machine 10 by a front connecting link 16 connected to the frame 11 by the front pivot 17 and by a rear connecting link 18 connected to the frame 11 by the rear pivot 19. As depicted sequentially in FIGS. 1 and 2, the rotation of the drive wheel 12, through the eccentrically mounted connecting rod 14, drives the aerating mechanism 15 into the ground G on the down stroke of the connecting rod 14 and out of the ground G on the up stroke of the connecting rod 14.

The aeration mechanism 15 includes a longitudinally extending subframe 15a pivotally connected to the front and rear connecting links 16, 18 and carries at the rearward end thereof a split tine assembly 20, including a fixed hollow tine 21 and a movable spoon 25 engageable with the hollow tine 21 in a manner to control the ejection of the wet core C therefrom in a manner described in greater detail below. A wet core is often referred to as a "green core", which is an aeration core recently removed from the ground without having been given sufficient time to dry. The hollow fixed tine 21 is driveable into the ground G, as demonstrated in FIGS. 1 and 2, by the rotation of the drive wheel 12. The tine 21 has a lower portion 22 that is driven into the ground G and a preferably conically-shaped upper portion 23 that has an open side 24 for the ejection of the green core C from the tine 21.

The movable spoon 25 is engageable with the fixed tine 21 to cover the open side 24 whenever the tine 21 is driven into the ground G, as depicted in FIG. 1. The spoon 25 is pivoted on the subframe at pivot 26 and is movable through a cam mechanism 30 so as to disengage the tine 21 to uncover the open side 24 of the upper portion 23 whenever the aeration mechanism 15 is moved to the ejection position as shown in FIG. 2. In this manner, the ejection of the green core C from the tine 21 is controlled to be dropped in a predetermined manner at an elevated position for reasons that will be apparent from the description of the core destroyer below.

One skilled in the art will recognize that an alternative split tine assembly design could include a tine 21 that has two halves, each tine half being pivotable about a corresponding respective pivot axis (not shown) so as to be capable of pivoting away from the other respective tine half. Such a tine design (not shown) would open when raised from the ground to eject the core therefrom, but close together before being driven back into the ground to remove another core. A cam mechanism (not shown), but similar to the cam mechanism 30, could control the movements of the tine halves. Yet another alternative tine design (not shown) would produce pivotal movement to only one of the tine halves with the other tine half being fixed. The primary difference between this alternative configuration and the split tine assembly 20 shown in FIGS. 1 and 2 is that the alternative design would preferably be split along the full length of the tine.

In operation, the tine is driven into the ground G by the rotation of the drive wheel 12 to force a core C into the lower portion 22 of the tine 21. This action pushes the core C that was already in the lower portion 22 prior to the tine 21 being driven into the ground G upwardly into the upper portion 23. The increased diameter of the conical upper portion 23 helps to separate the core from the tine 21. The closure of the open side 24 of the upper portion 23 by the spoon 25 retains the previous core C in the upper portion 23 until the vertically raised to the zenith of its motion by the drive wheel 12, at which point the cam mechanism 30 moves the spoon 25 away from the tine 21 to uncover the open side 24 and allow the prior core C to drop by gravity toward the ground G. One skilled in the art will note that the location of the front and rear pivots 17, 19 and the orientation of the front and rear connecting links 16, 18 cause the rear of the aeration mechanism 15 to raise vertically relative to the front thereof such that the open side 24 of the fixed tine faces downwardly toward the ground G to facilitate the dropping of the prior core C when the spoon 25 moves away from the tine 21.

The cam mechanism 30 includes an arcuate cam track 31 located adjacent to the front connecting link 16 and having a center of curvature forwardly of the front pivot. An actuation link 33 is pivotally connected to the spoon 25 and extends forwardly thereof to a cam follower 35 that is pivotally connected to the subframe 15a. The cam follower 35 is oriented to follow the cam track 31 as the subframe 15a is moved vertically by the drive wheel 12.

Since the distance between the cam track 31 and the front pivot 17 decreases relative to the vertical height of the cam track 31, the cam follower 35 is forced to rotate clockwise about its pivotal connection with the subframe 15a as the subframe 15a is pivoted upwardly and counterclockwise, as viewed in FIGS. 1 and 2, by the rotation of the drive wheel 12. The opposite motion of the cam follower 35 relative to the subframe 15a pulls the actuation link 33 and the attached spoon 25 rearwardly away from the fixed tine 21. A spring 37 interconnecting the actuation link 33 and the subframe 15a returns the cam follower 35 to a position in which the spoon 25 is closed against the fixed tine 21 when the drive wheel 12 drives the aeration mechanism 15 downwardly into the ground G.

One skilled in the art will recognize that the aeration machine 10 can be in the form of a riding or walk-behind version and will have a plurality of aeration mechanisms 15 supported from the frame 11 so that a number of cores are produced for each rotation of the drive wheel 12. Preferably, the respective aeration mechanisms 15 will be mounted on a crank mechanism (not shown) that will stagger the connections of the respective connecting rods 14 around the circumference of the drive wheel 12 so that all of the aeration mechanisms 15 are not driven into the ground at the same time, thereby minimizing vibrations in the frame 11 and allowing the size of the frame 11 to be economically designed. Minimizing vibration improves the balance and the handling of the machine 40.

One skilled in the art will also recognize that the aeration machine 10 is constantly moving forwardly in the direction of the arrow F during operation so that the cores C are taken from spaced locations along the surface of the ground G. Accordingly, the machine 10 is also moving forwardly while the tine 21 is engaged into the ground G. This motion is accommodated by the pivotal support of the aeration mechanism 15 from the front and rear pivots 17, 19. As a result, the subframe 15a will be rocked slightly rearwardly when the tine 21 in driven into the ground G in response to the continued forward motion of the frame 11.

Figure 4:
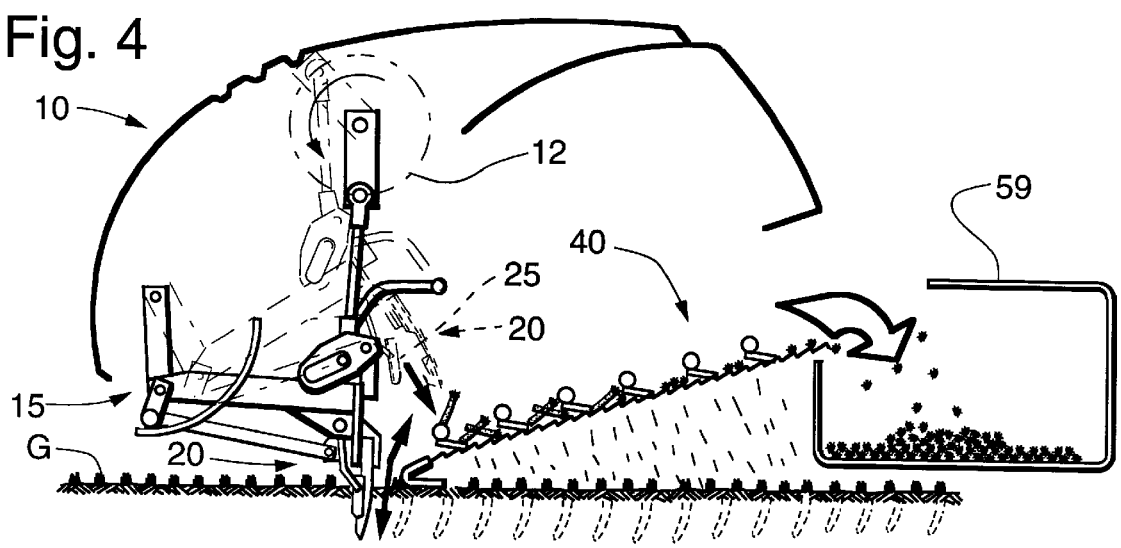
FIG. 4 is a schematic representation of a combination aerator machine as depicted in FIGS. 1 and 2 with a wet/dry core destroying apparatus that receives the green cores directly from the aerator, returns the earthen portion to the ground and collects the organic matter.

Referring now to FIGS. 3 and 4, one skilled in the art will readily realize the advantage of controlling the ejection of the prior green cores C at an elevated position above the ground G. In FIG. 3, the green cores C are ejected from the aeration mechanism 15, the raised ejection position of the aeration mechanism 15 allows the cores C to be deposited into a collection vessel 39 either trailing behind the aeration machine 10 or made a part thereof. In FIG. 4, the aeration mechanism 15 ejects the green cores onto a wet/dry core destroyer 40, described in greater detail below.

Figure 5:
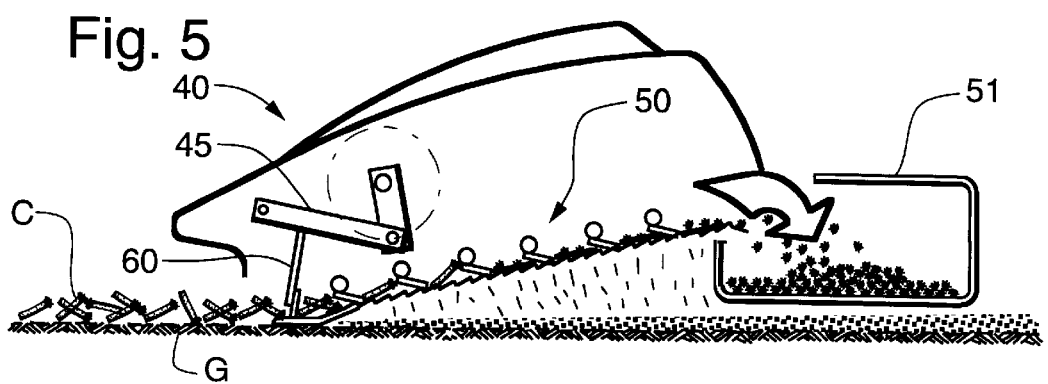
FIG. 5 is a schematic representation of a wet/dry core destroying machine that picks-up cores, whether the cores have been dried or are still moist, previously deposited on the ground by an aerator machine and then returns the earthen portion to the ground and collects the organic matter.
Figure 6:
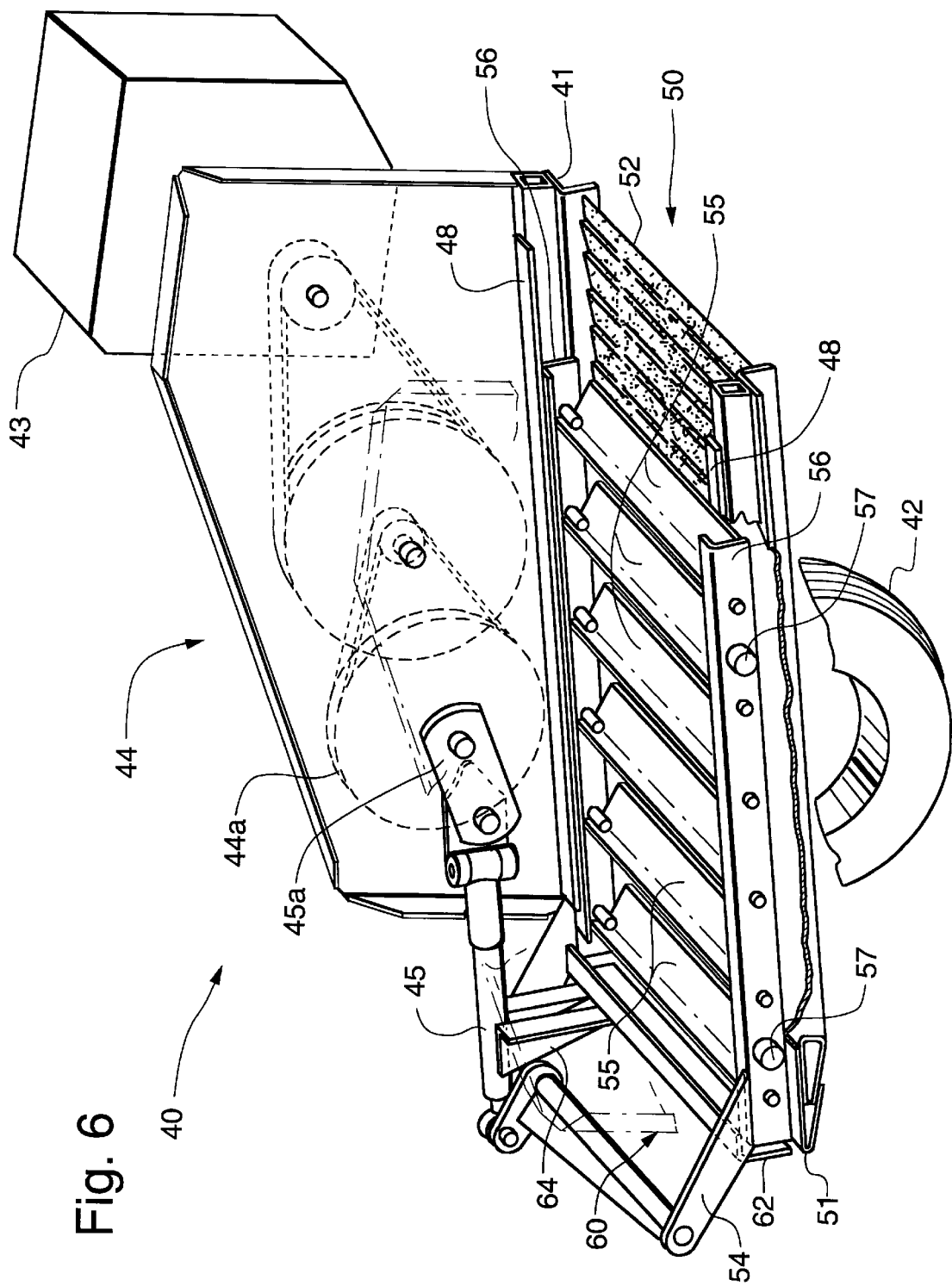
FIG. 6 is a schematic, partial left rear perspective view of a wet/dry core destroying machine incorporating the principles of the instant invention, portions of the frame being broken away to better show the scrubbing mechanism.
Figure 7:
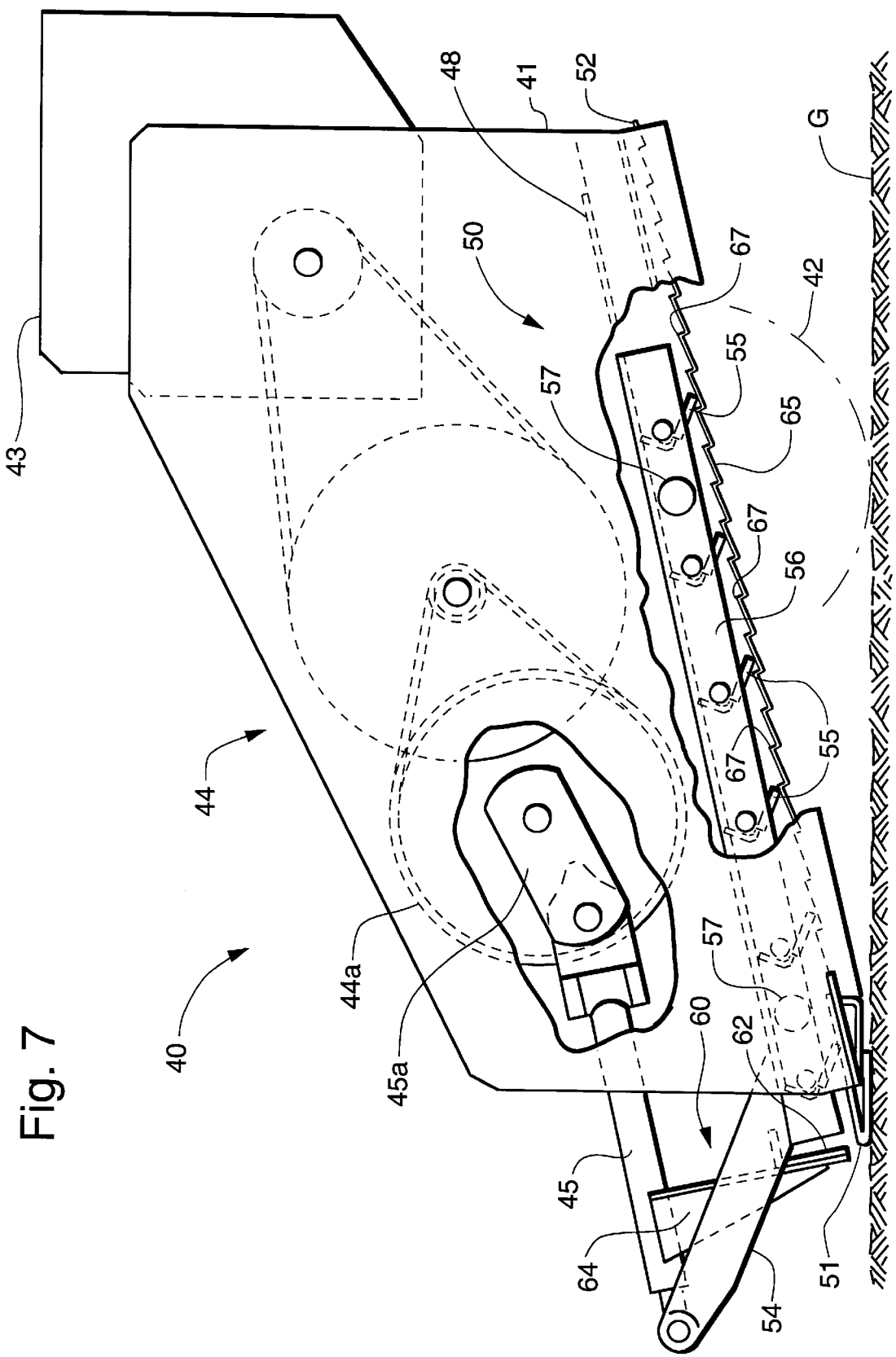
FIG. 7 is a schematic, partial side elevational view of the wet/dry core destroying machine depicted in FIG. 6, portions of the frame being broken away to better show the scrubbing mechanism.
Figure 8:
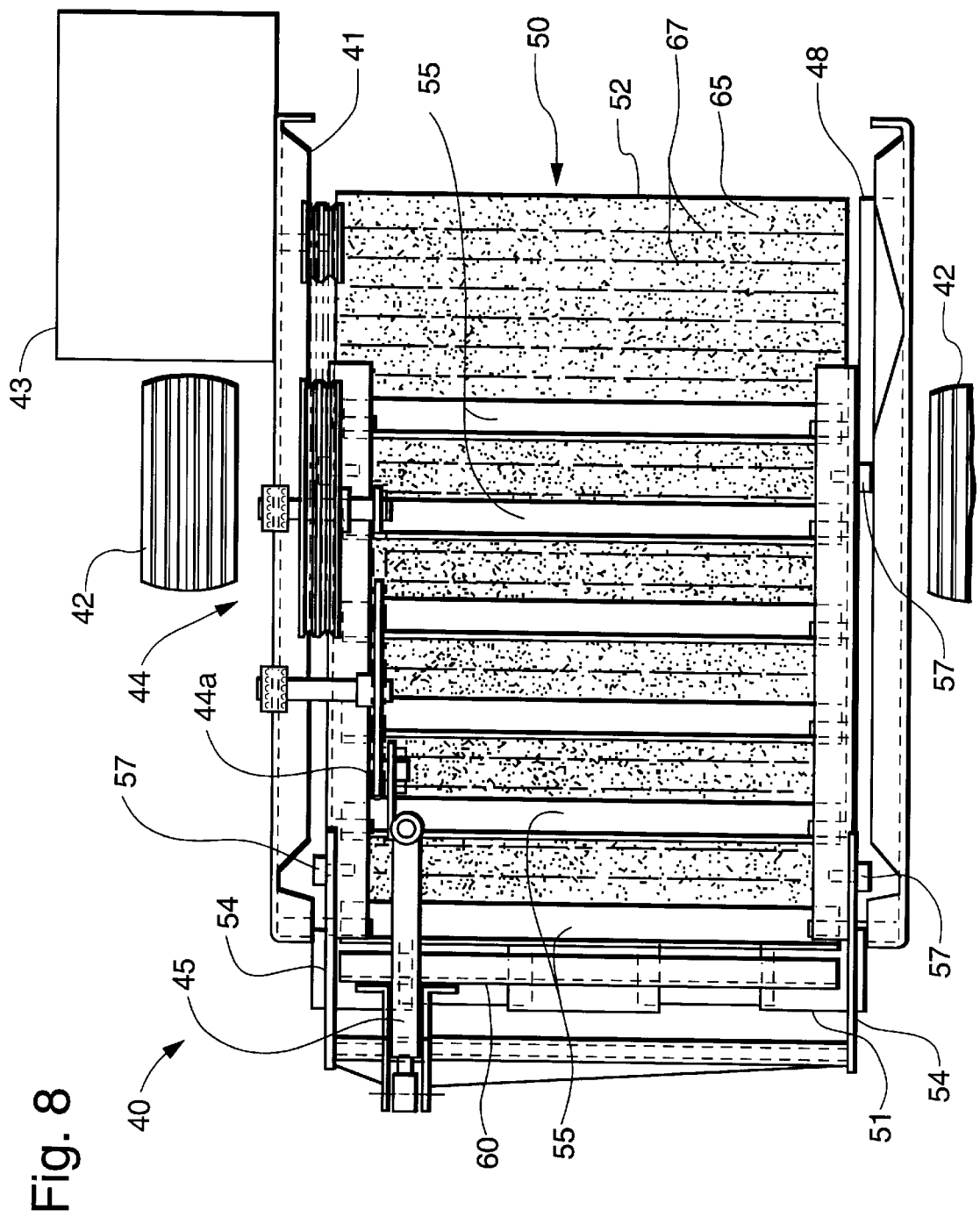
FIG. 8 is a schematic, partial top plan view of the wet/dry core destroying machine shown in FIG. 6.

In either instance depicted in FIGS. 3 and 4, the green cores C are ejected in a controlled manner onto a trailing apparatus without being placed on the ground G for either drying or subsequent handling. As a result, the ground G is not littered with green cores C and the subsequent passes of the aeration machine 10 will not suffer the problem of smashing green cores deposited on the ground G from a previous pass. FIG. 5 demonstrates that the core destroying machine 40 is not dependent upon being used in conjunction with an aeration machine 10, as the core destroying machine 40 is capable of picking up cores C deposited on the surface of the ground G by other conventional aeration machines.

Referring now to FIGS. 6 through 9, the details of the core destroying machine 40 can best be seen. This machine 40 can be constructed in several forms, including a self-propelled riding version, a walk-behind version, or as an attachment to another powered chassis, such as a riding lawn mower. The core destroying machine 40 preferably has a frame 41 having ground engaging wheels 42 mounted thereon to gage the height of the machine 40 relative to the ground G and to facilitate the movement of the machine 40 over the ground G. The operative components of the core destroying machine 40 are driven from a source of rotational power 43 and a speed reduction drive mechanism 44, including a rotatable final drive sprocket 44a that is connected through a crank member 45a to an eccentric drive link 45 to operate preferably at approximately 125 revolutions per minute.

The frame 41 of the core destroying machine 40 supports a linearly reciprocally movable scrubbing mechanism 50 having a forward edge 51 positioned adjacent the ground G and an elevated rearward edge 52. The drive link 45 is pivotally connected to a bifurcated bracket 54 and to the drive mechanism 44 so that the rotation of the drive mechanism 44 effects the linearly reciprocating movement of the scrubbing mechanism 50 in a manner described in greater detail below. Preferably, the drive link 45 and drive mechanism 44 are also drivingly connected to a counterbalance mechanism (not shown) arranged to reciprocate in opposition to the reciprocation of the scrubbing mechanism 50 to minimize vibration within the machine 40.

The drive link 45 also supports a core sweep 60 operable to deliver cores from the ground to the scrubbing mechanism 50. The core sweep 60 is positioned adjacent to the forward edge 51 of the scrubbing mechanism 50 and depends downwardly from the drive link 45 so as to be movable therewith. The core sweep 60 includes a transversely extending sweep member 62 having a transverse width substantially equal to the transverse width of the scrubbing mechanism 50. The sweep member 62 is supported from appropriate brackets 64, representatively shown in FIGS. 6–9, affixed to the drive link 45. In operation, the rotation of the drive link 45 around the final drive sprocket 44a effects movement of the sweep member 62 in an elliptical pattern to move cores from the ground G over the forward edge 51 and onto the scrubbing mechanism 50 for destruction.

The scrubbing mechanism 50 includes a pair of transversely spaced rails 56 affixed to the bracket 54 to effect simultaneous movement therebetween. The rails 56 support transversely and longitudinally spaced guide rollers 57 that are co-operable with corresponding, transversely opposing tracks 48 supported by the frame 41 to define the linear path of reciprocating movement of the scrubbing mechanism 50. Accordingly, the component of the movement of the drive link 45 about the final drive sprocket 44a parallel with the line of the tracks 48 drives the linear reciprocation of the scrubbing mechanism 50 along a stroke having a length twice the distance of the eccentrically mounted drive link 45 from the center of the final drive sprocket 44a.

The scrubbing mechanism 50 is also provided with a plurality of transversely extending vanes 55 spaced along the longitudinal length of the rails 56. The vanes 55 are pivotally supported from the opposing rails 56 and extend rearwardly from their respective pivotal connection. Preferably, the vanes 55 are constructed from a hard rubber material, similar to tire carcass, so as to provide a limited amount of flexibility along the transverse width thereof, yet not be destructive to the screen 65 against which the vanes 55 rub and minimize noise, as will be described in greater detail below.

The forward edge 51 of the scrubbing mechanism 50 is preferably formed from transversely overlapping sections of spring steel to create a floating forward edge 51 that is capable of following and conforming to transverse ground undulations. Preferably, the forward edge 51 is formed with a tight radius forming a rounded edge positioned next to the ground in a manner that is not conducive to scalping the ground, which would be highly undesirable in most applications. The operation of the forward edge 51 to pick-up cores without disturbing the ground surface is enhanced by an appropriate placement or location of the ground wheels 42 to provide a proper balance for the machine 40 to prevent a significant pressure of the forward edge 51 against the ground G. Preferably, the sweep member 62 is provided with a brush edge to facilitate the sweeping of cores over the forward edge 51 onto the scrubbing mechanism 50.

The vanes 55 are positioned above and in engagement with a screen 65 extending the longitudinal length of the scrubbing mechanism 50 and the transverse width between the rails 56. The screen 65 is constructed in a washboard configuration, as best seen in cross-section in FIG. 7, with stepped edges 67 that face rearwardly such that any material passing forwardly over the screen 65 would be rubbed into the stepped edges 67. Preferably, the screen 65 is constructed from screening material having approximately quarter to three-eighths inch diameter, hexagonal holes therethrough. It has been found that the hexagonal screening material provides superior results over screening material having round hole due to the orientation of the shearing surfaces formed in the hexagonal screening material. The spacing between the formed stepped edges 67 should preferably be about 15% to 30% of the length of the stroke of the scrubbing mechanism 50 so that the vanes will rub over several of the stepped edges 67 on each stroke of the scrubbing mechanism 50.

Referring now to the diagrammatic representations of FIGS. 10a through 12d, the operation of the core destroying machine 40 can best be seen. One skilled in the art will recognize that the description of the operation of the core destroying machine 40 is directed to the configuration of the core destroying machine 40 utilizing the core sweep 60 to pick-up cores C from the surface of the ground G, having previously been deposited there by an aeration machine. In the configuration in which an aeration machine 10 as described above is utilized, as depicted in FIG. 4, the core destroying machine 40 would not need the core sweep 60 as the green cores C would be deposited directly at the forward edge 51 of the scrubbing mechanism 50.

The operation of the core destroying machine 40 on the first revolution of the final drive sprocket 44a is shown in FIGS. 10a through 10d. Beginning with the core sweep 60 at the forwardmost position, further rotation of the final drive sprocket 44a in the direction indicated by the rotation arrow R will draw the sweep member 62 of the core sweep 60 rearwardly toward the screen 65 bringing cores C over the floating forward edge 51 of the scrubbing mechanism 50 toward the vanes 55. The forward edge 51 of the scrubbing mechanism 50 runs over the surface of the ground G without tearing into the ground G, due to the rounded forward edge 51 and the proper balancing of the machine 40, so that the core sweep 60 will bring the cores C from the ground over top of the forward edge 51 into the scrubbing mechanism 50.

Figure 10A:
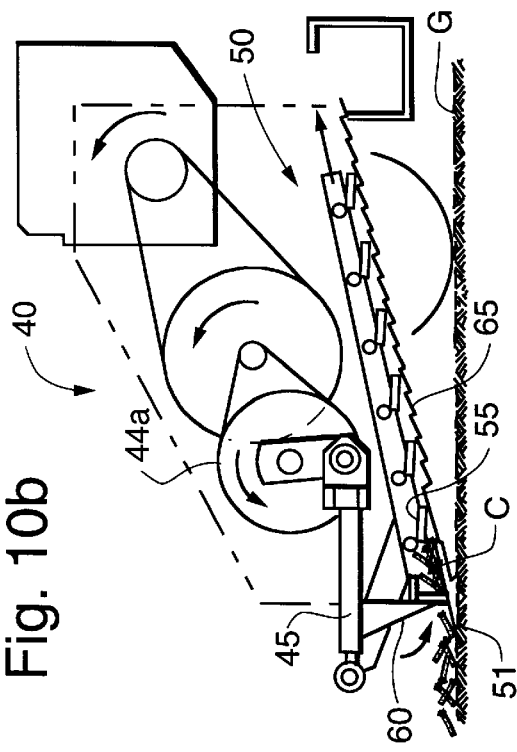
FIGS. 10a through 10d are diagrammatic sequential representations of the operation of the wet/dry core destroying machine depicted in FIGS. 6–9 beginning with the initial pick-up of green cores from the ground as represented in FIG. 5, each succeeding Fig. depicting the operation of the machine upon approximately a ninety degree rotation of the drive wheel.
Figure 10B:
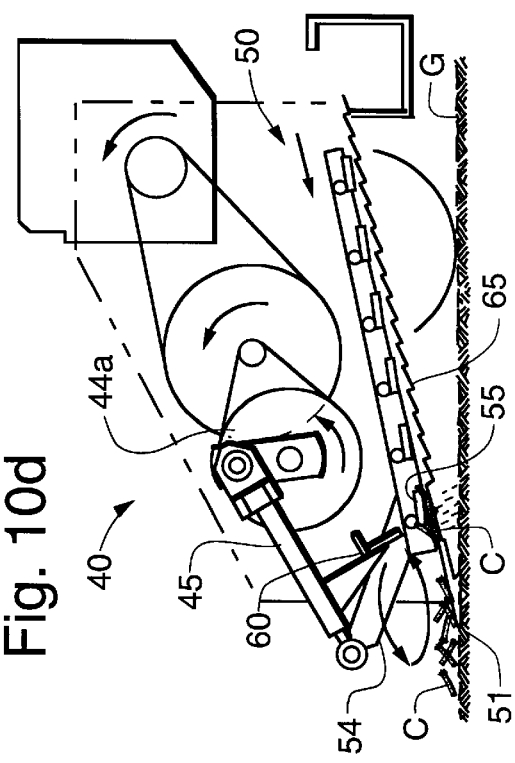

In FIG. 10b, the final drive sprocket 44a has rotated approximately ninety degrees moving the sweep member 62 over the forward edge 51 and onto the screen 65. As the sweep member 62 is moving rearwardly, the scrubbing mechanism 50 is also moving linearly rearwardly, confined by the tracks 48. The vertical components of the movement of the eccentrically mounted drive link 45 are accommodated by the pivotal connections with the bracket 54 and the final drive sprocket 44a at either end of the drive link 45 which allow the drive link to follow the rotation of the final drive sprocket 44a while keeping the scrubbing mechanism 50 moving linearly within the confines of the tracks 48.

Figure 10C:
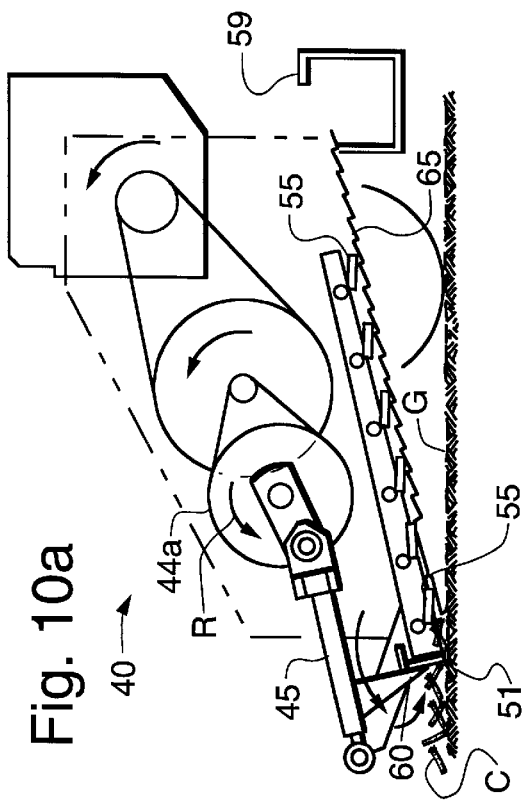

In FIG. 10c, the final drive sprocket 44a has rotated approximately another ninety degrees in the direction noted by the rotational arrow R from the representation of FIG. 10b. The scrubbing mechanism 50 has now reached the rearwardmost limit of its stroke. The core sweep 60 has pushed the cores C further rearwardly over the screen 65 pushing the cores C into the screen 65 and initiating the core destruction process. Meanwhile, the forward edge 51 of the scrubbing mechanism 50 continues along the surface of the ground G accumulating any cores forwardly of the forward edge 51 until the core sweep 60 returns to the position depicted in FIG. 10a to continue sweeping cores C over the forward edge 51 toward the vanes 55.

Figure 10D:
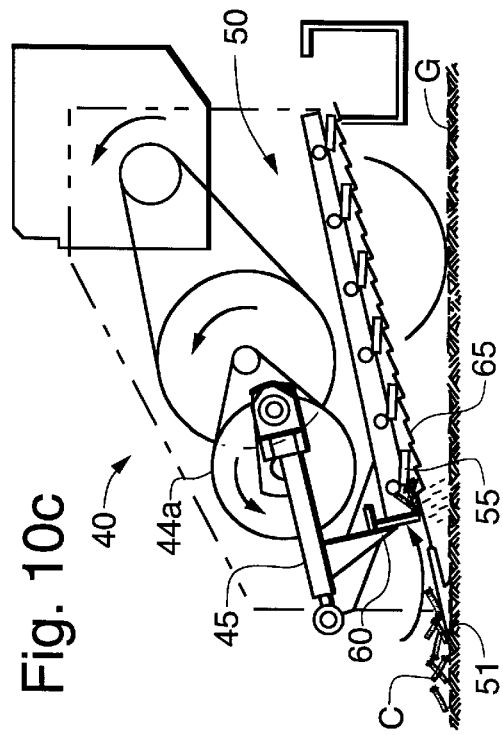

In FIG. 10d, the final drive sprocket 44a has made approximately ninety degrees further rotation from the position of FIG. 10c. The upward movement of the eccentrically mounted drive link 45 raises the rearward end of the drive link 45, while the forward end of the drive link is restrained in a linear path parallel to the reciprocal movement of the scrubbing mechanism 50 due to the bracket 54. As a result, the core sweep 60 raises vertically and passes over top of the cores C accumulating at the forward edge 51 of the scrubbing mechanism 50 to be positioned again forwardly of the forward edge 51, as demonstrated in FIG. 11a, to sweep cores C rearwardly into the scrubbing mechanism 50 on the next stroke.

In the sequence of movement depicted in FIGS. 10a through 10c, the scrubbing mechanism 50, including the vanes 55, are moving rearwardly against the screen 65. As the drive link 45 traverses the forward portion of its stroke as demonstrated in FIGS. 10c, 10d and 11a, the scrubbing mechanism 50 moves forwardly. The vanes 55 ride up over the cores C on the screen 65 by pivoting relative to the rails 56, yet push the cores C downwardly into the screen 65 and forwardly against the stepped edges 67. In this manner, the cores C begin to disintegrate with the earth passing through the holes in the screen 65 to the ground G.

Continuing into the second stroke of the scrubbing mechanism 50, as seen in FIGS. 11a through 11d, the mechanical sequence described above with respect to FIGS. 10a through 10d is repeated. Referring specifically first to FIG. 11a, it can be seen that the forwardmost vane 55 has ridden over top of the cores C swept rearwardly onto the screen 65 by the core sweep 60 during the first stroke. While these first cores were partially disintegrated by the action of the vanes 55 pressing the cores C into the screen 65 and into the stepped edges 67, a substantial portion of the cores C remains intact.

On the rearward portion of this second stroke of the scrubbing mechanism 50, demonstrated in FIGS. 11a through 11c, the rearwardly extending first vane 55 pushes this first group of cores C rearwardly, making room for the second group of cores C being swept onto the screen 65 over the forward edge 51 by the core sweep 60. This movement of the cores C rearwardly against the screen 65 continues the disintegration of the first group of cores C, as the second group of cores C begins to be disintegrated by being swept rearwardly over the screen 65 by the core sweep 60.

As noted above with respect to FIG. 10, the cyclical movement of the rear of the drive link 45 in a vertical direction by the final drive sprocket 44a, coupled with the restraining of the vertical movement of the forward end of the drive link 45 due to connection thereof with the bracket 54, results in an elliptical movement of the sweep member 62 as depicted by the broken arrows in FIGS. 10d and 11d. As the core sweep 60 lifts over the second group of cores C and returns forwardly of the forward edge 51, the scrubbing mechanism 50 also moves forwardly, resulting in the second vane passing over the first group of cores C and the first vane passing over the second group of cores C, driving the cores into the screen 65 and into the stepped edges 67 to further disintegrate the cores, dropping the earth through the screen 65 to the ground G.

Figure 12A:
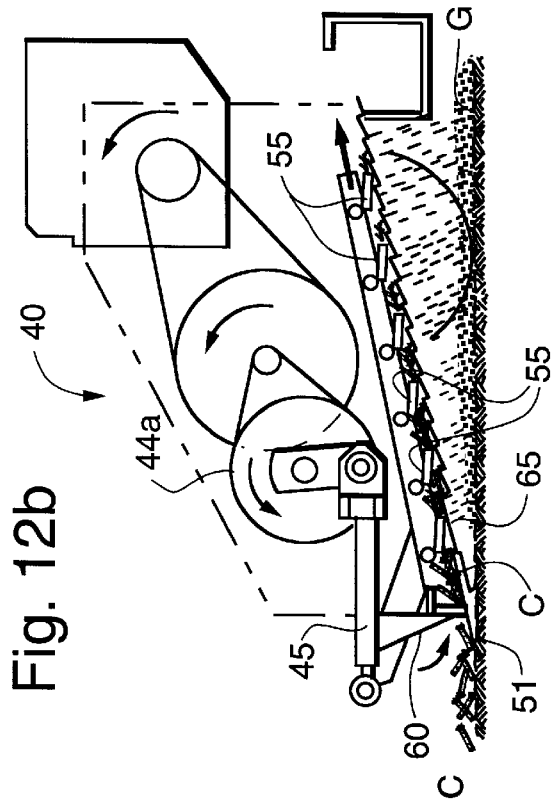
FIGS. 12a through 12d are diagrammatic sequential representations of the operation of the wet/dry core destroying machine depicted in FIGS. 6–9 showing the operation of the machine as the scrubbing mechanism is filled with collected green cores, each succeeding Fig. depicting the operation of the machine upon approximately a ninety degree rotation of the drive wheel.
Figure 12B:
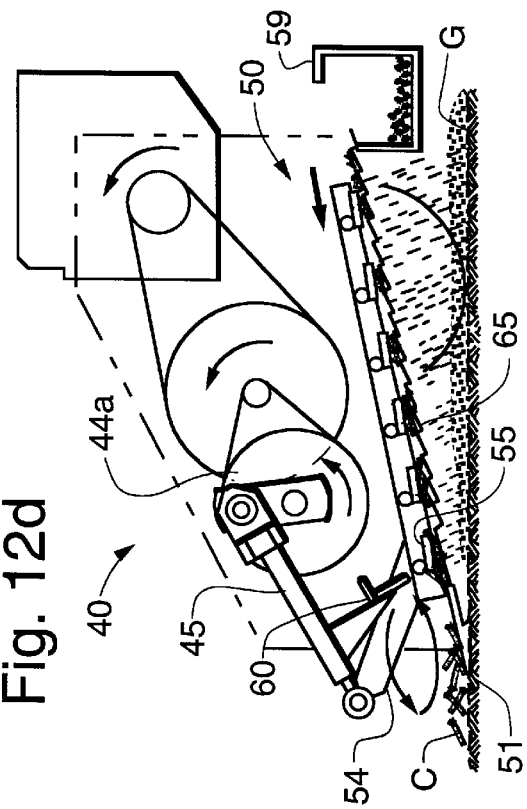
Figure 12C:
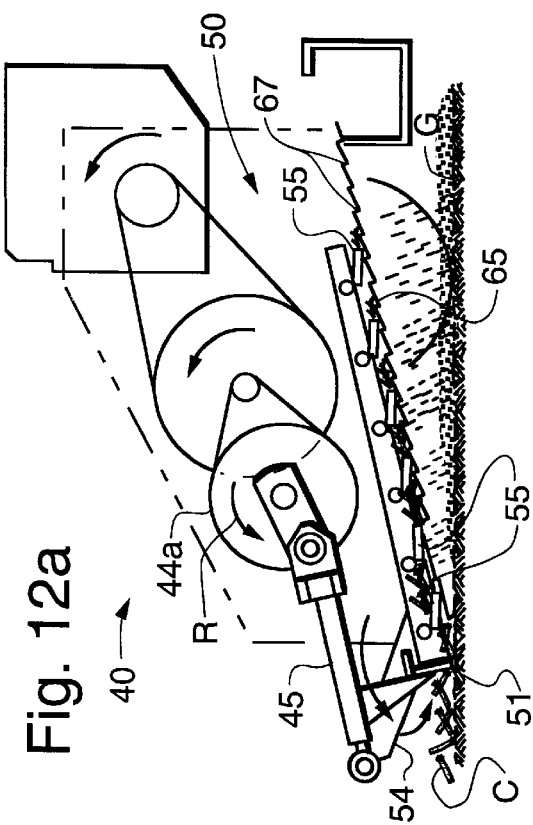
Figure 12D:
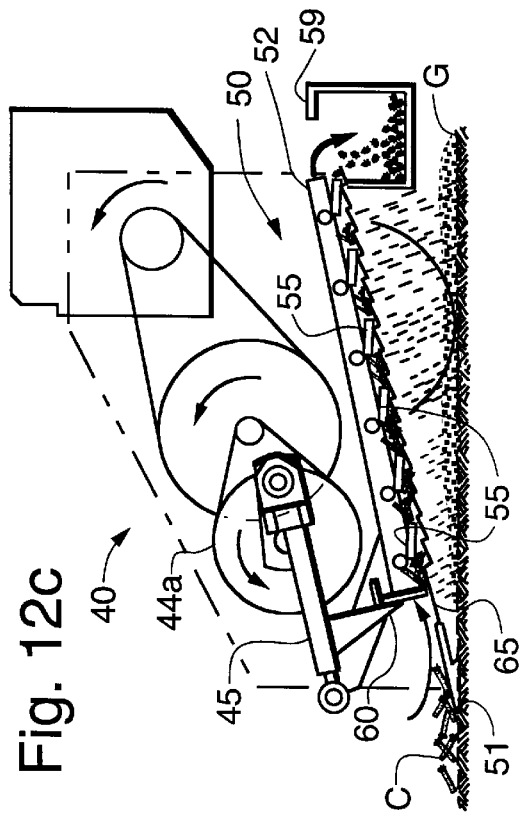

The strokes described above with respect to FIGS. 10 and 11 are duplicated repeatedly until the entire screen 65 is filled with groups of cores conveyed rearwardly in a destructive reciprocating manner, as is depicted in FIGS. 12a through 12d. The disintegration of the cores C is substantially complete by the time the first group of cores reaches the end of the screen 65 due to the repeated rubbing against the stepped screen 65. The only remaining part of the cores C is the vegetation thatch and the associated root system. This organic matter is finally conveyed rearwardly off the rearward edge 52 by the rearwardmost vane 55 into a collection hopper 59, as depicted in FIG. 12c, where the organic matter is retained until disposed at a selected site remote from the aerated ground G.

The earthen part of the cores C has been disintegrated and passed through the screen 65 onto the ground G. This loose earth can be swept back into the holes made by the removal of the cores C from the ground G and/or incorporated into a top dressing that might include seeds, fertilizer, etc. The organic matter cannot accumulate on the aerated ground G. Furthermore, the cores C can be disintegrated by the core destroying machine 40 immediately after being extracted from the ground G. As a result, the utilization of the ground, such as at a golf course, is interrupted only minimally. In fact, the aeration process can be accomplished at night since there is no requirement that the cores be dried for any length of time before being destroyed by the core destroying machine 40, which would result in the utilization of the ground G as a golf course or other similar operation without interruption whatsoever.

One skilled in the art will realize that the width of the intake of the core destroying machine 40 should preferably be wider than the scrubbing mechanism 50 so as to prevent the ground wheels 42 from smashing cores while on the ground G before being swept into the scrubbing mechanism on a subsequent pass of the core destroying machine 40. One simple manner to accomplish this objective is to equip the forward edge 51 of the scrubbing mechanism 50 with a pair of outwardly and forwardly diverging wings (not shown) passing over the surface of the ground G and directing cores outside the width of the scrubbing mechanism 50, which might otherwise be run over by one of the ground wheels 42, into the core sweep 60 as the core destroying machine 40 is moved over the surface of the ground G.

The preferred embodiment of the core destroying machine 40 is in the form of a walk behind configuration in which the power source 43 is a small gasoline (i.e. lawn mower) engine (not shown) that drives the ground wheels 42 to advance the core destroying machine 40 over the surface of the ground G with only steering effort required by the operator walking behind the machine 40. The small gasoline engine (not shown) provides adequate power for effecting a reciprocation of the scrubbing mechanism 50 and operating the core sweep 60 in addition to driving the ground wheels 42. The screen 65 would have dimensions of approximately 24 inches wide and approximately 36 inches long. While the above description of the invention refers to a mechanically driven core destroying machine 40, preferably powered by a small engine, an alternative configuration for the drive mechanism would be hydraulic drives. The small gasoline engine would produce adequate power to drive a hydraulic system that could include a hydraulic motor (not shown) for powering the reciprocating movement of the scrubbing mechanism 50 and another hydraulic motor(s) (not shown) for powering the traction drive through the ground wheels 42.

A core destroying machine 40 constructed as described above will have the versatility of being operated independently of an aeration machine to sweep cores up from the ground or to be coupled to an aeration machine, such as the configuration described above, to receive cores directly from the aeration machine such that the cores do not contact the ground, except in the form of the disintegrated earthen portion passing through the screen 65.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. An aeration core destroying machine operable to receive aeration cores and disintegrate said aeration cores to remove an earthen portion from an organic portion, comprising:
   a frame defining a forward end and a rearward end;
   a drive mechanism supported on said frame;
   a screen member supported from said frame and being formed in a washboard configuration with transversely oriented stepped edges, said screen member having a rearward discharge edge; and
   a reciprocating scrubbing mechanism operably driven from said drive mechanism and being positioned above said screen member to be engageable therewith for rubbing said aeration cores therebetween and for conveying said aeration cores rearwardly along said screen member toward said discharge edge.

2. The aeration core destroying machine of claim 1 wherein said scrubbing mechanism includes:
   a pair of transversely spaced, longitudinally extending rails reciprocally movable in a fore-and-aft direction by said drive mechanism; and
   a plurality of longitudinally spaced, transversely oriented scrubbing vanes pivotally supported between said rails, said vanes being positioned to engage said aeration cores on said screen member, said vanes being pivotable at a pivotal connection with said rails to permit said vanes to ride over top of the aeration cores on said screen member during a portion of the reciprocal movement of said scrubbing mechanism.

3. The aeration core destroying machine of claim 2 wherein said vanes extend rearwardly of the pivotal connection thereof with said rails so that said vanes pivotally move to ride over top of the aeration cores on the screen member when said scrubbing mechanism is moved forwardly.

4. The aeration core destroying machine of claim 3 wherein said screen member is oriented with said stepped edges facing rearwardly such that the forward movement of said vanes operates to urge the aeration cores forwardly into said stepped edges for further disintegration thereof.

5. The aeration core destroying machine of claim 4 wherein said scrubbing mechanism is reciprocally movable along a stroke having a defined longitudinal length, said screen member having a longitudinal spacing for said stepped edges that is less than half of the longitudinal length of said scrubbing mechanism stroke.

6. The aeration core destroying machine of claim 5 wherein the longitudinal spacing for said stepped edges is in the range of 15 to 30% of the longitudinal length of said scrubbing mechanism stroke, so that each said vane is operable to rub across a plurality of stepped edges for each stroke of said scrubbing mechanism.

7. The aeration core destroying machine of claim 6 wherein said scrubbing mechanism and said screen member are inclined upwardly from a forward edge to said discharge edge of said screen member.

8. The aeration core destroying machine of claim 7 further comprising:
a sweep mechanism positioned forwardly of said scrubbing mechanism to collect aeration cores from the ground and convey said collected aeration cores over said forward edge for engagement with said reciprocating scrubbing mechanism.

9. The aeration core destroying machine of claim 8 wherein said sweep mechanism is driven by said drive mechanism in a coordinating reciprocating movement with said scrubbing mechanism, said forward edge being formed from spring material to conform to changing ground undulations.

10. The aeration core destroying machine of claim 7 further comprising:
a collection vessel supported from said frame rearwardly of said discharge edge of said screen member to receive material discharged by said scrubbing mechanism rearwardly off said screen member.

11. A method of destroying aeration cores comprising the steps of:
receiving said aeration cores on a screen member having stepped edges oriented transversely to a direction of travel;
engaging said aeration cores with a scrubbing mechanism to rub said aeration cores across said screen member in a first direction to disintegrate said aeration cores against said screen member;
forcing said aeration cores against said stepped edges by said scrubbing mechanism moving over said screen member in a second direction opposite to said first direction to further disintegrate said aeration cores;
repeating said engaging and forcing steps until an earthen portion of said aeration cores is separated from an organic portion of said aeration cores;
passing said earthen portion through said screen member to be deposited on the ground; and
discharging said organic portion off a rearward discharge edge of said screen member into a collection vessel.

12. The method of destroying aeration cores of claim 11 wherein said engaging and forcing steps are accomplished by reciprocating said scrubbing mechanism in a fore-and-aft direction relative to said screen member.

13. The method of destroying aeration cores of claim 12 wherein said engaging step is accomplished during a rearward movement of said scrubbing mechanism relative to said screen member and said forcing step is accomplished during a forward movement of said scrubbing mechanism, said forcing step overlapping a plurality of said stepped edges for each corresponding portion of said scrubbing mechanism.

14. The method of destroying aeration cores of claim 13 wherein said receiving step includes the step of:
gathering aeration cores from the surface of the ground forwardly of said screen member by a sweep mechanism that conveys the collected aeration cores onto said screen member.

15. The method of destroying aeration cores of claim 13 wherein said receiving step includes the steps of:
obtaining said aeration cores directly onto said screen member from an aeration machine that produces said aeration cores; and
controlling the discharge of said aeration cores from said aeration machine by timing the movement of a movable spoon member forming part of a split tine assembly to drop the discharged aeration core directly onto said screen member.

* * * * *